Patented Aug. 7, 1945

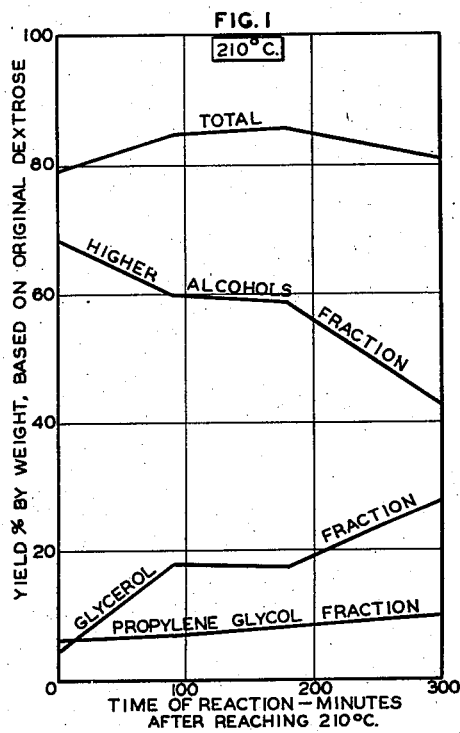
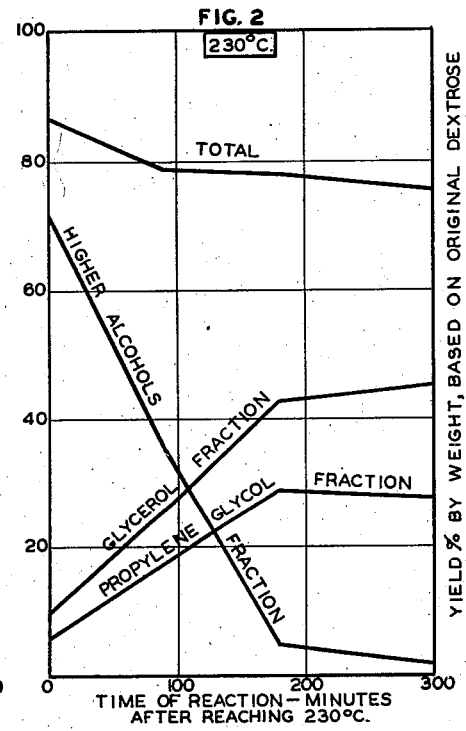
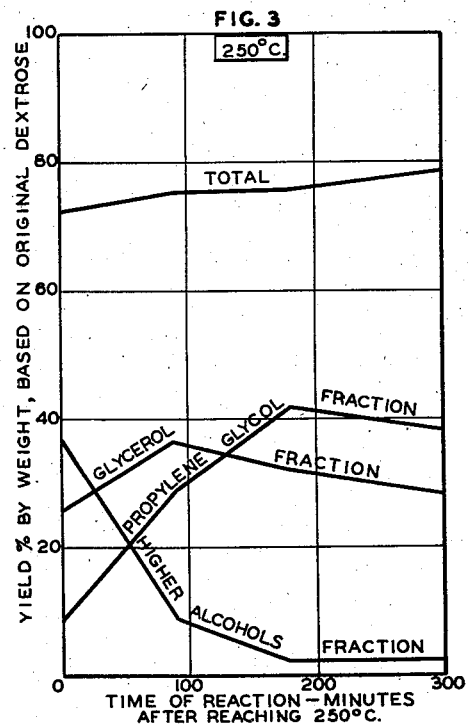

2,381,316

UNITED STATES PATENT OFFICE 2,381,316

CATALYST AND PROCESS FOR PRODUCING POLYHYDROXY COMPOUNDS

Leonard A. Stengel and Frank E. Maple, Terre Haute, Ind., assignors to Commercial Solvents Corporation, Terre Haute, Ind., a corporation of Maryland Application June 28, 1939, Serial No. 281,602

4 Claims. (Cl. 260—635)

Our invention relates to a process for producing polyhydric alcohols and other valuable products from polyhydric alcohols of higher molecular weight, or from carbohydrates, by catalytic hydrogenation. More specifically, our invention relates to an improved type of catalyst for such a process.

It has been known that sugars and polyhydric alcohols may be transformed to polyhydric alcohols of lower molecular weight, or lower oxygen content, by a catalytic hydrogenation process termed "hydrogenolysis." In such a process, for example, sugars such as dextrose or sucrose may be transformed to mannitol, sorbitol, glycerol, propylene glycol, and other products, in varying proportions. Numerous catalysts have been proposed in the past for utilization in such a process, but these catalysts have had various disadvantages, such as high cost, inability to produce high yields of the desired products, and inability to control the ratio of products produced.

We have now discovered an improved type of catalyst which produces consistently high yields of polyhydric alcohols, which may be extremely inexpensive to manufacture, and which makes possible positive control of the ratio of products produced. Our new catalysts comprise copper substances which are substantially insoluble in the medium in which the reaction is effected, together with activating agents comprising metal fluorides. In this connection, the term "copper substances" includes metallic copper, per se, and the term "metal fluorides" includes ammonium fluoride, as well as the true metal fluorides. We prefer, however, to employ metal fluorides which are likewise insoluble in the medium in which reaction is carried out, and for purposes of easy recovery of the reaction products it is desirable that both the copper substance and the fluoride should be insoluble in the final reaction mixture as well as in the initial mixture. The choice of substantially water insoluble compounds will effect this end, and will also serve the desirable purpose of enabling the catalyst to be prepared by co-precipitation of the two components. This method of preparation, in general, produces catalysts of markedly improved activity.

The optimum proportion of fluoride activating agent to be employed in our catalyst compositions will depend to some extent upon the activity of the particular fluoride chosen, and on the method of incorporation in the catalyst. Thus, one of the more active fluorides, such as calcium fluoride, may in general be employed in lower concentration than a less active fluoride, or one which may be substantially dissolved in the medium, and thus removed from its immediate sphere of activity on the surface of the copper substance. Similarly, a somewhat greater proportion of fluoride may be desirable in cases of mechanical admixture of the components, than would be required if the components were more intimately mixed, as by co-precipitation. The ratio of activating agent, however, is not critical, and we have employed calcium fluoride in amounts varying from 5% to over 100%, based on the weight of the copper substance. In general, we prefer to employ the activating agent in amounts of 10% to 80% by weight.

Our preferred catalyst comprises co-precipitated cupric oxide and calcium fluoride. This catalyst may be readily prepared from very cheap materials, such as "blue stone" ($CuSO_4.5H_2O$), commercial calcium chloride ($CaCl_2.2H_2O$), and sodium fluoride of commercial grade, such as the insecticide powder. In the preparation of this catalyst, a solution of calcium chloride may suitably be added to a solution of cupric sulfate, and a solution of sodium fluoride and commercial caustic soda added to the resulting mixture to co-precipitate cupric hydroxide and calcium fluoride. The resulting precipitate, after washing and drying, comprises essentially cupric oxide and calcium fluoride. During the utilization of such a catalyst in the hydrogenation reaction, the cupric copper may be largely reduced to cuprous copper and a smaller percentage of metallic copper, but the catalyst retains activity and is effective in producing the same yields, or somewhat diminished yields, in a second operation.

Although the cupric oxide-calcium fluoride catalyst constitutes the preferred catalyst in our process, it should be distinctly understood that our invention is not specifically limited thereto. Active catalysts have been prepared from other copper compounds, such as copper silicate, cuprous oxide, and metallic copper resulting from complete reduction of the oxides; and from other fluorides, such as barium, strontium, sodium, and ammonium fluorides. In general, it may be said that the combination of an insoluble copper substance and a metal fluoride will constitute an active catalyst in our process.

Although, for best results, our catalysts should be free from chlorides, and should be operated substantially in the absence of chlorides, as disclosed in co-pending application Ser. No. 281,658, by Julian K. Dale, filed June 28, 1939, these catalysts are free from poisoning by the usual types of catalyst poisons, or by other materials commonly encountered in the commercial sources of raw materials employed in our process. Thus, our catalysts may be produced from crude commercial grades of inorganic chemicals, preferably, however, removing any chlorides which may be present, by washing or other suitable method. Likewise, our catalysts may be employed for the hydrogenation of crude carbohydrate materials, such as blackstrap molasses, especially high yields being obtained if these materials are free from chlorides, or are previously treated to remove chlorides as disclosed in the co-pending application referred to above.

In utilizing our new catalysts, the general procedures for carrying out the hydrogenolysis reaction which have previously been used, may be suitably followed. The usual types of apparatus for this purpose may be used, as for example pressure autoclaves, fitted with suitable agitating devices, or reaction vessels of the "rocking bomb" type, described in "Reactions of Hydrogen," Homer Adkins, University of Wisconsin Press, 1937, Chapter III. It should be definitely understood that our invention is not limited to any particular type of apparatus, or any particular mechanical details for carrying out the reaction.

The hydrogenolysis process in which our new catalysts are employed consists essentially in dissolving or suspending the sugar or polyhydric alcohol in a suitable liquid medium, incorporating finely-divided catalyst in the resulting mixture, and introducing hydrogen under super-atmospheric pressure, while agitating and heating to the desired reaction temperature. The temperature is preferably maintained constant throughout the reaction, and the hydrogen pressure may likewise be maintained substantially constant by continuously or intermittently introducing hydrogen to replace that absorbed by the reaction. The agitation should be sufficient to maintain through contact of the reacting materials with the catalyst, and to prevent local over-heating of the polyhydroxy compounds, which might result in caramelization, or charring.

The polyhydroxy compounds suitable for hydrogenolysis by the use of our catalysts constitute any of the polyhydroxy aliphatic compounds containing more than 2 hydroxy groups, such as the carbohydrates, and the polyhydric alcohols containing 3 or more hydroxy groups. Among the carbohydrates which are particularly suitable for treatment in accordance with our invention, are the simple mono- and di-saccharides, particularly glucose and sucrose. Crude sources of such sugars may be employed, provided the materials are free from chlorides, as has previously been pointed out. Thus, blackstrap molasses, high-test molasses, and crude corn sugar, when free from chlorides, may be converted into high yields of polyhydric alcohols; and the polyhydric alcohols, as for example, sorbitol, may be transformed to polyhydric alcohols of lower molecular weight or lower oxygen content.

The liquid medium in which the reaction is effected may be chosen in accordance with prior practices in this regard, the mono- and di-hydric alcohols being particularly suitable. For example, we have carried out the hydrogenolysis of sugars with our catalysts with such different materials of this type as methanol, propylene glycol and 2-ethylhexanol. When employing our catalysts it is not necessary to utilize a completely anhydrous medium. This is particularly advantageous when molasses, or other commercial source of carbohydrate which normally contains water, is employed. We prefer, however, to maintain the water content of the reaction mixture as low as may be convenient with the particular source of carbohydrate, and preferably below approximately 30% by volume, based on the total liquid in the initial reaction mixture. Similarly, although various other organic liquids may be utilized, we prefer to employ methanol as the reaction medium.

The amount of catalyst to be employed in our process will depend upon the nature and activity of the particular catalyst in question, and to some extent upon the nature of the reactants and the conditions of reaction. Thus, a greater concentration of a less active catalyst is usually required than would be necessary with one of the most active catalysts, such as the co-precipitated cupric oxide-calcium fluoride catalyst, and a somewhat greater concentration of catalyst may be found necessary for the conversion of crude carbohydrate materials than is necessary for pure sugars or alcohols. Likewise, the activity of the catalyst may be apparently increased by depositing it on a suitable support, such as silica gel, kieselguhr, or the like, in which case a lower concentration of the catalyst proper may often be employed. In general, we have found that a concentration of from 0.1% to 10%, based on the weight of the polyhydroxy compound to be hydrogenated, will be suitable when using an active catalyst and pure reactants, with proportionately greater concentrations for less active catalysts, or when employing crude raw materials.

A wide range of hydrogen pressure may be utilized when carrying out our process, without substantially affecting the reaction. The optimum pressure in any given case may depend to some extent upon the nature of the material being reacted, and the solubility of hydrogen in the reaction medium. The effective pressure will, of course, constitute the partial pressure of hydrogen in the mixture of hydrogen and vapors of the liquid medium used for the reaction. However, it is generally sufficient to consider the total pressure maintained in the reaction vessel, and we have found that this pressure should preferably be substantially above 1000 lbs. per sq. in., and suitably from 1500-2000 lbs. per sq. in. If the reaction vessel is adjusted to such pressure before heating, an increased pressure will result during heating and prior to hydrogen absorption, after which the pressure may again be adjusted either continuously or intermittently, to the initial value. Pressures above 2000 lbs. may be employed if desired, but satisfactory results are obtainable within the range 1500-2000 lbs. per sq. in., and since this constitutes the usual range of pressure for hydrogen available commercially in cylinders, this constitutes an advantageous pressure range for carrying out our process.

The temperature and time of reaction to be employed in our process depend primarily upon the ratio of products desired. This relationship between time and temperature of reaction, and ratio of products, constitutes an outstanding advantage of our catalysts, since by this means it is possible to control at will the type of product produced. This relationship is illustrated in the graphs shown in the accompanying drawing, representing the ratio of products produced under different conditions of time and temperature of reaction. Figures 1, 2, and 3 represent, respectively, reaction temperatures of 210° C., 230° C., and 250° C.

In each case the temperature of the reaction mixture was raised, in the same time interval, to the chosen reaction temperature, and was maintained at this point for the periods indicated in the graphs. Total yields and yields of separate fractions of various molecular weights are shown for the hydrogenolysis of dextrose, utilizing our preferred catalyst prepared by the co-precipitation of cupric oxide and calcium fluoride, as in Example I, below. The reaction in each case was effected in anhydrous methanol, employing approximately 88 parts by weight of methanol per 100 parts by weight of dextrose, and approximately 5.5 parts by weight of the co-precipitated cupric oxide-calcium fluoride catalyst. The hydrogen pressure was maintained at approximately 1800 lbs. per sq. in. by intermittently introducing hydrogen to replace that absorbed in the reaction. The products were separated into three fractions: a propylene glycol fraction consisting almost entirely of propylene glycol; a glycerol fraction containing a major proportion of glycerol, together with other polyhydric alcohols of intermediate molecular weight; and a higher alcohols fraction comprising sorbitol, mannitol, and other polyhydric alcohols of high molecular weight.

The relationship between temperature and ratio of reactants, under the above reaction conditions, is further illustrated in the table below, for a fixed reaction time, and for a wider temperature range than shown in the graphs:

Table I

| Temperature | Yield of product—Percent by weight of sugar | | | |
|---|---|---|---|---|
| | Propylene glycol fraction | Glycerol fraction | Higher alcohols fraction | Total |
| 150 | 1.2 | 1.6 | 73.6 | 76.4 |
| 175 | 3.1 | 4.4 | [1] 95.9 | [1] 103.3 |
| 190 | 3.9 | 6.3 | 63.7 | 73.9 |
| 210 | 9.9 | 27.4 | 43.0 | 80.1 |
| 230 | 27.9 | 45.3 | 0.0 | 72.2 |
| 250 | 38.8 | 28.4 | 0.0 | 67.2 |

[1] Contained a small percentage of water.

Our invention may now be further illustrated by the following specific examples:

*Example I*

A catalyst was prepared by adding 3 parts by weight of commercial copper sulfate (CuSO₄.5H₂O) 

and 0.8 part by weight of commercial calcium chloride (CaCl₂.2H₂O) to 22 parts by weight of boiling water, and adding to the resulting mixture, while boiling, a solution comprising 0.46 part by weight of commercial sodium fluoride, and 1.2 parts by weight of commercial caustic soda, dissolved in 11 parts by weight of hot water. The resulting mixture was boiled for 2 hours, after which the precipitate was washed, filtered, and dried in an oven at about 110 C., for approximately 24 hours. The dried product was then powdered prior to use.

Approximately 2.5 parts by weight of the catalyst, prepared as above described, was added to 45 parts by weight of sucrose, and 40 parts by weight of anhydrous methanol, in a reaction vessel of the Adkins rocking bomb type. The air in the reaction vessel was then displaced by hydrogen, and hydrogen was introduced to a pressure of 1800 lbs. per sq. in. The temperature was then raised, while agitating the bomb, to a temperature of 245° C., and was maintained at this point for 6 hours, with continued agitation. During this time hydrogen was introduced intermittently to replace that absorbed in the reaction, maintaining the pressure in the vessel at approximately 1800 lbs. per sq. in. At the conclusion of the reaction, the bomb was cooled in a current of cold air, the hydrogen pressure released, and the product removed for analysis. A yield of 40.8% propylene glycol fraction, and 37.7% glycerol fraction based on the weight of the sucrose, was obtained. No analysis was made for higher alcohols.

*Example II*

A catalyst, prepared as in Example I, was utilized for the hydrogenolysis of substantially pure dextrose, at a temperature of 160° C. for a period of 6 hours, following the procedure employed in Example I. The following yield was obtained:

| | Per cent |
|---|---|
| Propylene glycol fraction | 0.06 |
| Glycerol fraction | 0.60 |
| Higher alcohols fraction | 93.1 |

The higher alcohols fraction in this case was found to consist very largely of sorbitol.

*Example III*

A catalyst prepared as in Example I, was employed for the hydrogenolysis of substantially pure dextrose, at a temperature of 234° C. for a period of 6 hours, utilizing as the reaction medium 35 parts by weight of propylene glycol per 45 parts by weight of dextrose. A yield of approximately 31.8% propylene glycol fraction, and approximately 26.0% glycerol fraction was obtained. No analysis was made for higher alcohols.

*Example IV*

A catalyst prepared as in Example I, was employed for the hydrogenolysis of chloride-free high-test molasses. The molasses was concentrated to a water content of approximately 11%, and mixed with approximately 220 parts by weight of anhydrous methanol per 100 parts by weight of molasses, dry basis. Approximately 12.5 parts by weight of catalyst was utilized per 100 parts by weight of dry molasses, and the reaction was carried out at 245° C. for 5 hours, with a hydrogen pressure of 2000 lbs. per sq. in. A yield of 50.7% propylene glycol fraction, and 27.9% glycerol fraction was obtained. No analysis was made for higher alcohols.

*Example V*

A catalyst prepared as in Example I, was employed for the hydrogenolysis of crude sorbitol, the reaction being carried out as in Example I, for a period of 4 hours at 240° C. A yield of 38.6% propylene glycol fraction, and 39.4% glycerol fraction was obtained, based on the weight of the crude sorbitol. No analysis was made for higher alcohols.

*Example VI*

A catalyst was prepared by adding 6 parts by weight of commercial copper sulfate and 1.6 parts by weight of commercial calcium chloride to approximately 36 parts by weight of boiling water, introducing 3 parts by weight of finely-divided kieselguhr into the resulting mixture, and then adding to the boiling mixture a solution of approximately 0.92 part by weight of commercial sodium fluoride and 2.4 parts by weight of commercial caustic soda in approximately 20 parts by weight of hot water. The mixture was boiled for 2 hours, and then filtered. The catalyst was then washed with water until the washings were neutral to litmus, dried at 110–125° C., and then pulverized.

This catalyst was employed for the hydrogenolysis of chloride-free high-test molasses, at a temperature of 240° C., for 6 hours, as in Example IV above. A yield of 64.0% propylene glycol fraction, and 13.1% glycerol fraction was obtained. No analysis was made for higher alcohols.

*Example VII*

A catalyst, prepared as in Example VI, was utilized for the hydrogenolysis of galactose at 210° C., for 4 hours. Approximately 240 parts by weight of anhydrous methanol, and approximately 5 parts by weight of catalyst were employed per 100 parts of galactose. A yield of 46.1% dulcitol was obtained. No analysis was made for other alcohols.

*Example VIII*

A catalyst was prepared by moistening copper silicate ($CuSIO_3$) with anhydrous methanol, and thoroughly admixing calcium fluoride in an amount equal to one-half the weight of the copper silicate. This catalyst was employed for the hydrogenolysis of dextrose at 1800 lbs. pressure and 250° C., for 6 hours. Employing the amounts of catalyst and anhydrous methanol utilized in Example I above, a yield of 34.4% propylene glycol fraction and 24.4% glycerol fraction was obtained. No analysis was made for higher alcohols.

*Example IX*

A catalyst was prepared as in Example VIII, above, substituting cuprous oxide for copper silicate, and this catalyst was employed for the hydrogenolysis of dextrose, under the conditions utilized in Example VIII. A yield of 9.7% propylene glycol fraction, and 26.9% glycerol fraction was obtained. No analysis was made for higher alcohols.

It is to be understood of course that the above examples are illustrative only, and do not limit the scope of our invention. Various other insoluble copper substances, activated with other metal fluorides, may suitably be employed as the catalysts, and the reaction conditions and mechanical details of effecting the reaction may be varied within wide limits, as previously pointed out. In general, it may be said that the use of any equivalents or modifications of procedure, which would occur to one skilled in the art, is included within the scope of our invention.

Our invention now having been described, what we claim is:

1. A process for the hydrogenolysis of a polyhydroxy aliphatic organic compound chosen from the class consisting of mono- and disaccharides, which comprises subjecting said compound to the action of hydrogen at a temperature of 125–300° C., and a pressure in excess of 1000 lbs. per sq. in., in the presence of an organic liquid medium containing less than 30% water and a catalyst comprising essentially co-precipitated cupric oxide and calcium fluoride.

2. A process for the hydrogenolysis of a polyhydroxy compound of the class consisting of mono- and disaccharides, which comprise subjecting said compound to the action of hydrogen under a pressure of 1500–2000 lbs. per sq. in., and at a temperature of 150–250° C., in a medium comprising essentially anhydrous methanol, and in the presence of a catalyst comprising essentially co-precipitated cupric oxide and calcium fluoride in approximately equal amounts by weight.

3. A process for the hydrogenolysis of a polyhydroxy aliphatic compound chosen from the class consisting of mono- and disaccharides, which comprises subjecting said compound to the action of hydrogen under super-atmospheric pressure and temperature, in the presence of a stable organic liquid medium, and a catalyst comprising essentially coprecipitated cupric oxide and calcium fluoride in a ratio of 10–80 parts by weight of calcium fluoride to 100 parts by weight of cupric oxide.

4. A process for the hydrogenolysis of a polyhydroxy aliphatic compound chosen from the class consisting of mono- and disaccharides which comprises subjecting the said compound to the action of hydrogen under super-atmospheric pressure and temperature, in the presence of a stable organic liquid medium, and a catalyst comprising essentially coprecipitated cupric oxide and calcium fluoride.

LEONARD A. STENGEL.
FRANK E. MAPLE.